(12) United States Patent  (10) Patent No.: US 8,165,434 B2
Bourget  (45) Date of Patent: Apr. 24, 2012

(54) HIGH EFFICIENCY OPTICAL COUPLER

(75) Inventor: Paul L. Bourget, Kentwood, MI (US)

(73) Assignee: LumenFlow Corp., Middleville, MI (US)

( * ) Notice: Subject to any disclaimer, the term of this patent is extended or adjusted under 35 U.S.C. 154(b) by 191 days.

(21) Appl. No.: 12/405,398

(22) Filed: Mar. 17, 2009

(65) Prior Publication Data

US 2010/0239207 A1    Sep. 23, 2010

(51) Int. Cl.
*G02B 6/26* (2006.01)
*G02B 6/32* (2006.01)
*G02B 6/42* (2006.01)
*F21V 7/00* (2006.01)

(52) U.S. Cl. ........ 385/31; 385/33; 362/296.01; 362/341

(58) Field of Classification Search .................... 385/31, 385/33; 362/296.01–311.15, 341–350
See application file for complete search history.

(56) References Cited

U.S. PATENT DOCUMENTS

| 3,647,284 | A | | 3/1972 | Elings et al. | |
|---|---|---|---|---|---|
| 4,241,382 | A | | 12/1980 | Daniel | |
| 4,460,939 | A | | 7/1984 | Murakami et al. | |
| 5,265,106 | A | * | 11/1993 | Garcia et al. | 372/3 |
| 5,309,340 | A | | 5/1994 | Shigeta et al. | |
| 5,446,639 | A | | 8/1995 | Hamanaka et al. | |
| 5,560,700 | A | | 10/1996 | Levens | |
| 5,613,767 | A | | 3/1997 | Hamanaka et al. | |
| 5,640,284 | A | * | 6/1997 | Tanitsu et al. | 359/869 |
| 5,826,963 | A | | 10/1998 | Cassarly et al. | |
| 5,828,803 | A | * | 10/1998 | Eckhouse | 385/88 |
| 5,842,767 | A | | 12/1998 | Rizkin et al. | |
| 5,927,849 | A | * | 7/1999 | Cassarly et al. | 362/551 |
| 6,332,688 | B1 | | 12/2001 | Magarill | |
| 6,558,032 | B2 | | 5/2003 | Kondo et al. | |
| 6,758,582 | B1 | * | 7/2004 | Hsiao et al. | 362/302 |
| 6,869,206 | B2 | * | 3/2005 | Zimmerman et al. | 362/310 |

(Continued)

FOREIGN PATENT DOCUMENTS

FR    708577    12/1930

(Continued)

OTHER PUBLICATIONS

International Searching Authority Invitation to Pay Additional Fees, International Application No. PCT/US2010/024211, International Filing Date Feb. 15, 2010.

*Primary Examiner* — Ryan Lepisto
*Assistant Examiner* — Jerry Blevins
(74) *Attorney, Agent, or Firm* — Warner Norcross & Judd LLP

(57) ABSTRACT

An optical coupling device enabling spherical or hemispherical light sources to be more fully utilized by gathering more of the emitted radiation and reducing the angle of emission. The optical coupling device includes a first conic reflector having an aperture at the first conic reflector vertex; a second conic reflector coaxial with the first conic reflector and opening toward the first conic reflector; a light source positioned at the second conic reflector vertex; and a negative element located at the aperture for reducing the numerical aperture of the light emitted from the optical coupling device. The optical coupling device may include a refractive medium between the first and second conic reflectors. The present invention provides for improved efficiencies when transferring or coupling optical energy into additional optical systems, and may be used with solid state light as well as conventional sources.

32 Claims, 5 Drawing Sheets

U.S. PATENT DOCUMENTS

| | | |
|---|---|---|
| 6,953,252 B2 | 10/2005 | Way |
| 7,029,150 B2 | 4/2006 | Finch |
| 7,055,991 B2 | 6/2006 | Lin |
| 7,083,313 B2 | 8/2006 | Smith |
| 7,112,916 B2 | 9/2006 | Goh et al. |
| 7,330,314 B1 * | 2/2008 | Cobb et al. .................... 359/634 |
| 2003/0215180 A1 * | 11/2003 | Dimas et al. .................... 385/31 |
| 2005/0190559 A1 | 9/2005 | Kragl |
| 2006/0018125 A1 * | 1/2006 | Miller et al. .................. 362/554 |
| 2007/0091618 A1 * | 4/2007 | Belek ........................... 362/345 |
| 2007/0103912 A1 | 5/2007 | Namii |

FOREIGN PATENT DOCUMENTS

| | | |
|---|---|---|
| JP | 406130301 | 5/1994 |

* cited by examiner

HIGH EFFICIENCY OPTICAL COUPLER

BACKGROUND OF THE INVENTION

The present invention relates to the collection of light from a high numerical aperture (N.A.) source and reforming the light into a lower N.A. point source for coupling into an optical system.

Most modern illumination sources, such as bulbs, light emitting diodes and arc lamps are extended sources that radiate light in a spherical or hemispherical pattern. Standard refractive optics can transmit or focus a portion of the source light but at a substantial loss, typically greater than 70%. Standard reflective optics possess better efficiencies but essentially still lose 50% of the total light. With the ever increasing cost of energy, it will be important to generate and utilize light as efficiently as possible. To that end, light will preferably be shaped, controlled and otherwise manipulated, and then placed within the desired area and function with as little loss as possible. Such conditions call for the use of light coupling technologies. Exemplary applications for light couplers include fiber optic delivery systems, defined area illumination, non-laser based collimated Sources, and life science technologies illumination.

The ability to refract or reflect light from a high N.A. format to a low N.A. format can be done in a straight forward manner; a simple lens held in front of a bulb accomplishes this. The light emanates from the lens either diverging, converging or collimated. However, only a small percentage of the total light generated is captured for use, typically 12.5% for an F/#–1.0 lens. The goal is to convert the high N.A. light source into low N.A. light source while reforming the light into a point source or quasi point source (i.e. an extended source whose emission area is small with respect to the optical system stop). Implementing such a system is complex and can require a bulky apparatus. Typically, the solution is to restrict the amount of light captured, or greatly increase the aberration of the reconstituted point source. In general, currently available light coupler techniques are a compromise between the amount of effective light gathering ability and the complexity of the optical mechanisms.

SUMMARY OF THE INVENTION

The present invention provides an improved optical coupler system capable of converting a high N.A. light source into a low N.A. light source. The optical coupler system includes a first conic reflector defining an aperture at its vertex, a second conic reflector facing the first conic reflector, a light source at the vertex of the second conic reflector, and a negative optical element in the aperture at the vertex of the first conic reflector.

In all embodiments the light source is placed at or near the vertex of the second conic reflector. The second conic reflector operates at the maximum system aperture by receiving a plane wave from the first conic reflector. This creates the advantage that the light source and any associated mounting hardware blocks or absorbs the least amount of reflected light from the first conic reflector, thus improving efficiency. Any other location for the light source diminishes the light coupling efficiency.

The function of the second conic reflector is to converge the reflected light onto a focal plane with the desire to set the focal plane past the vertex of the first conic reflector. This is achieved at least in part by adjusting the radius and conic constant of the second conic reflector. It becomes apparent that the best location for the negative element is at the vertex of the first conic mirror. This is where the N.A. of the converging light can be changed before its arrival at the focal plane. There is a range for the diameter of the negative element between a large diameter that will block or divert a large amount of emitted light and a small diameter at which the effectiveness of the negative element will diminish. The negative element will push out the location of the focal plane thus making the light more usable for the next stage of optical tasking.

In a first embodiment, the first conic reflector is parabolic and the light source is located at the focus of the first conic reflector. The light from the source is reflected off the first conic reflector, is collimated and transfers to the second conic reflector. Light reflected from the second conic reflector enters the negative element before reaching its focal plane, thereby reducing the converging ray angle in order to obtain the desired N.A. By optimizing the curves of the second conic reflector in relationship to the negative element, more light can be captured and manipulated to perform a specified function (such as coupling into a fiber optic), thus achieving the desired N.A which increases the efficiency of the optical coupler system.

In a second embodiment, a refractive medium is located between the first and second conic reflectors. The negative element is a concave first surface of a meniscus positive lens used for generating collimated light. Optionally, the refractive medium can define a conic conforming to the first conic reflector within the enclosure created by the first and second conic reflectors, thereby replacing the functionality of the negative element.

In a third embodiment, the system includes a third conic reflector and a fourth conic reflector for creating a second reflective enclosure. The light source is located at the vertex of both the second and fourth conic reflectors, which share a common axis and diverge in opposing directions. Light from the light source reflects off the first conic reflector toward the second conic reflector. In like manner, light from the light source reflects off the third conic reflector toward the fourth conic reflector, and again toward the third conic reflector before passing through an opening between the first and second enclosures surrounding the light source. Light from both enclosures passes through the negative element, which includes a concave first surface and a convex second surface. An additional converging lens further shapes the light to produce a low N.A. light source.

In a fourth embodiment, the first conic reflector and the second conic reflector join at a common edge with a minimal amount of seam exposure thus eliminating any light path leakage. The optical coupler reduces aberrations in the system by allowing either the second conic reflector or the third negative element a large variability based on the desired application. The conic required at the second conic reflector and the negative optical element are task specific, e.g., coupling into a fiber optic requires different reflective functions than the creation of collimated light.

The improved optical coupler can be configured for a variety of optical functions such as shaping light, fiber optic coupling, creating collimated or near collimated light, or any unique illumination purpose. Such a system works well for hemispherical radiators like LEDs but can accommodate filaments and arcs sources as well. The present invention reforms a high N.A. source light (for example, N.A.>0.9) to a lower N.A. source light (for example, 0.55 or less), thus allowing the use of conventional optics in the post focal plane optical path with very little loss of light.

These and other objects, advantages and features of the invention will be more fully understood and appreciated by reference to the drawings and the description of the current embodiments.

DESCRIPTION OF THE CURRENT EMBODIMENT

Figure 1:
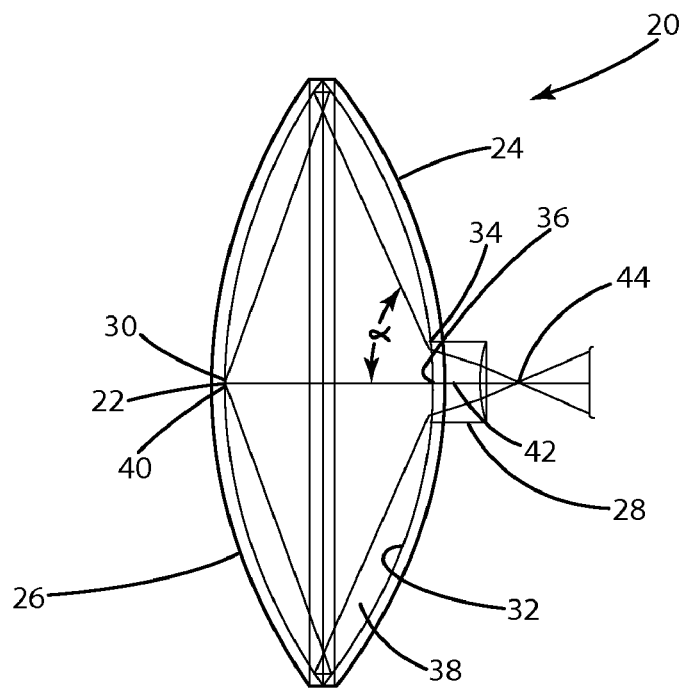
FIG. 1 is a cross-sectional view of a first embodiment of the invention.

A high efficiency optical coupler in accordance with an embodiment of the invention is illustrated in FIG. 1 and generally designated 20. The high efficiency optical coupler 20 includes a light source 22, first reflector 24, second reflector 26, and negative element 28. The light source 22 is located generally at the vertex 30 of the second reflector 26 and transmits a light output or optical radiation over a solid angle of almost 2 Pi steradians (an NA of 0.95) onto the interior surface 32 of the first reflector 24. The interior surface 32 of the first reflector 24 reflects the light from the light source 22, thus changing the path of light emitted by the light source 22. The first reflector 24 is a conic and has an additional function of collimating the light from the light source 22, thus transferring a plane wave to the second reflector 26. Light is then reflected off the second reflector 26 toward the negative element 28 aligned with an aperture 34 at the vertex 36 of the first reflector 24. The negative element 28 then directs the emitted light into a low N.A. beam through the aperture 34 as depicted in FIG. 1.

Figure 2:
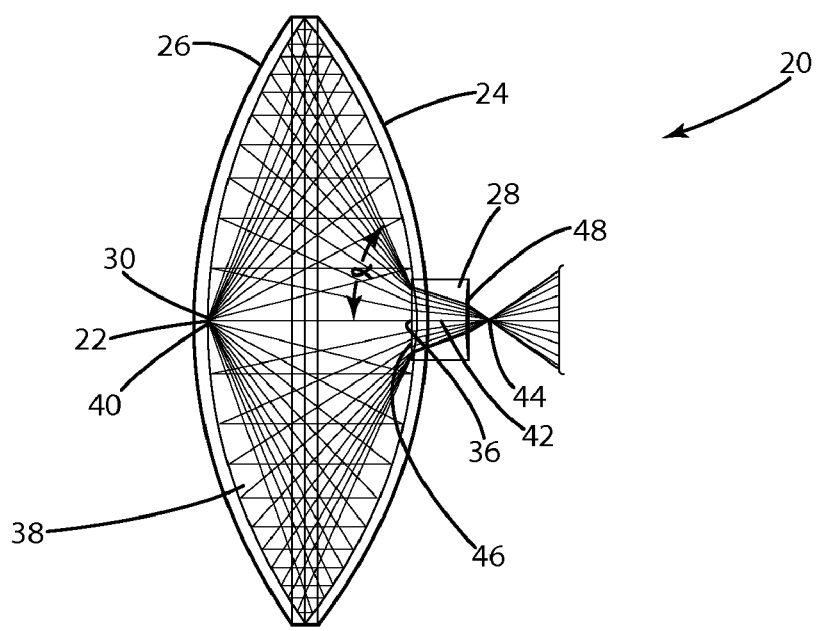
FIG. 2 is an optical ray trace of a cross-sectional view of the optical coupler in FIG. 1.

The light source 22 can include a light emitting diode (LED). However, the light source 22 is not restricted to an LED; any small area emitter, for example an arc lamp, can be utilized. As depicted in FIG. 2, the light source 22 is tangentially joined with the second reflector 26 substantially at the vertex 30 of the second reflector 26. Placement of the light source 22 substantially at the vertex 30 of the second reflector 26 allows for convenient access to the light source 22 via a panel or removable cover (not shown). This access to the light source 22 can render convenient the repair or replacement of an inoperable LED or other small area emitter, for example.

As further depicted in FIGS. 1-2, the first reflector 24 is adhered to or otherwise mounted on or within a parabolic contour for receiving and reflecting the light received from the light source 22. The first reflector 24 is coaxial with the second reflector 26 and operatively joined with the second reflector 26 for creating a first enclosure 38. The first reflector 24 can further include a focus 40, wherein the light source 22 is located at the focus 40. The first reflector 24 can be made from the optical polishing of aluminum. However, the surface quality required for the optical task does not restrict the material to be aluminum. Any suitable metal, plastic, or glass material with reflective properties can be utilized. The advantage to aluminum is that its heat transfer properties allow the removal of heat generated by the light source 22. This added advantage allows for a more compact design in which the main optical function also performs a secondary and often necessary mechanical function.

Again as shown in FIGS. 1-2, the high efficiency optical coupler 20 includes a second reflector 26 which receives the plane wave generated by the first reflector 24, again changing the direction of light emitted by the light source 22. The second reflector 26 directs converging light toward the negative element 28. This second reflector 26 may be a conic, for example parabolic, elliptical, spherical, or hyperbolic. Additionally, the first and second reflectors 24, 26 are not limited to identical contours, and each may be in accordance with any of the same or different conics having the same or different conic values. One can maximize the optical performance of the high efficiency optical coupler 20 by allowing the conic value of the second reflector 26 to adjust as a function of aberrations to be reduced or eliminated. A common aberration can be negative spherical aberration. The conic value of the second element 26 can also depend upon the energy transfer function at the negative element 28, e.g. if the end result is to couple light into a fiber, or to couple light into a lens used for collimation, etc.

In the present embodiment, the light reflecting off the second reflector 26 converges at its focus 42 at the same angle as it was emitted by the source 28, thus having the same N.A. as the source. The converging light intercepts or impinges the negative element 28 before reaching second reflector focus 42 within the negative element, and before converging at a focal plane 44. The angle of convergence α and the N.A. are thereby reduced. As depicted in FIGS. 1-2, the first vertex 36 and coaxial second vertex 30 are offset by a first distance less than the distance separating the second vertex 30 from the second focus 42. In this regard, light intercepts or impinges a first surface 46 of the negative element 28 prior to converging at its focal plane 44, thereby allowing the negative element 28 to alter the N.A. of the light source 22.

As depicted in FIGS. 1-2, the negative element 28 is shown as a double concave refractive lens aligned with the aperture 34. The negative element 28 may be other shapes, such as a meniscus lens, toroidal lens, or diffractive lens depending on the desired optical output. The second reflector 26 may be constructed from polished aluminum. However, as stated above, the surface quality required for the optical task does not restrict the material to be aluminum. Any metal, plastic, or glass material with reflective qualities can be utilized, and the first and second reflectors 24, 26 may in fact form a continuous molded structure. Additionally, a relatively large-diameter negative element 28 can block or divert a large amount of emitted light, while a relatively small diameter negative element 28 can diminish the effectiveness of the negative element 28. Accordingly, the ratio of negative element 28 diameter to first reflector 24 diameter should be balanced, optionally to a ratio of 1:10.

Figure 3:
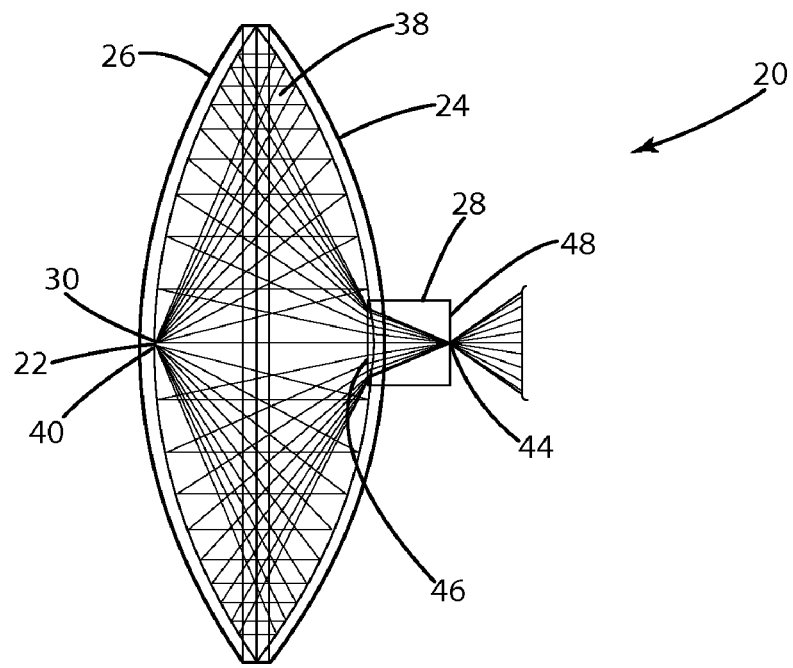
FIG. 3 is an optical ray trace of a cross-sectional view of a second embodiment of the invention illustrating the focal point at the end of a refractive element.
Figure 4:
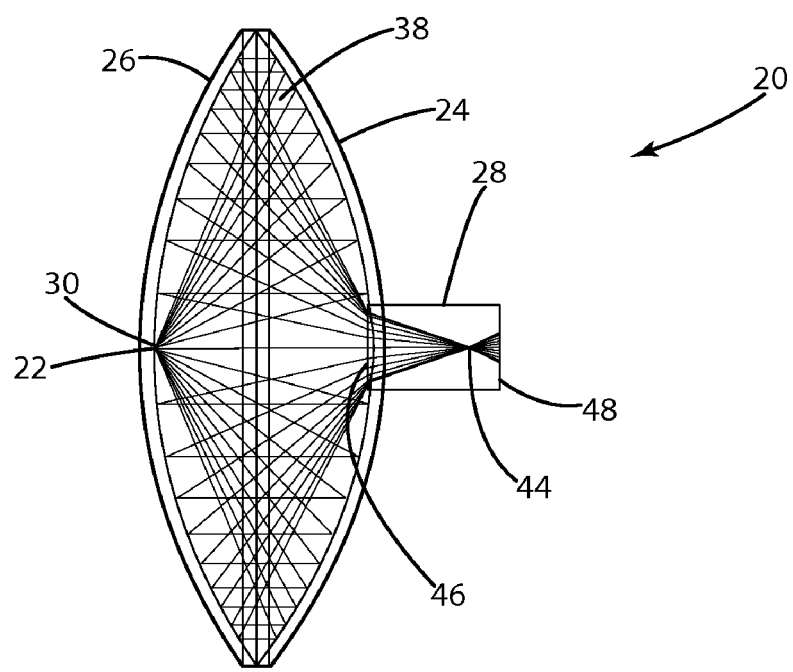
FIG. 4 is an optical ray trace of a cross-sectional view of a third embodiment of the invention illustrating a focal point within a refractive element.

As depicted in FIGS. 3-4, light impinges or intercepts the negative element 28 before converging at the optical focal plane 44. Light emanates from the light source 22 located at the focus 40 of the first reflector 24. Light then reflects off the first reflector 24 toward the second reflector 26 before reflecting off the second reflector 26 toward the negative element 28 having a concave first surface 46. The refracted light converges at a focal plane 44 at a second surface 48 of the negative element in FIG. 3, or within the negative element 28 as depicted in FIG. 4.

Figure 5:
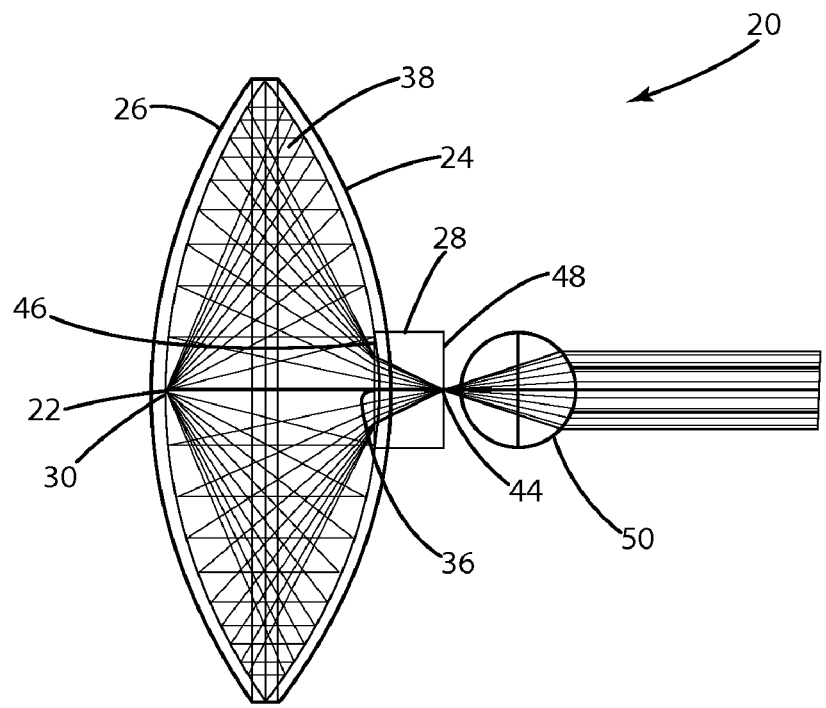
FIG. 5 is an optical ray trace of a cross-sectional view of a fourth embodiment of the invention illustrating a refractive element and spherical element acting as a collimator.
Figure 6:
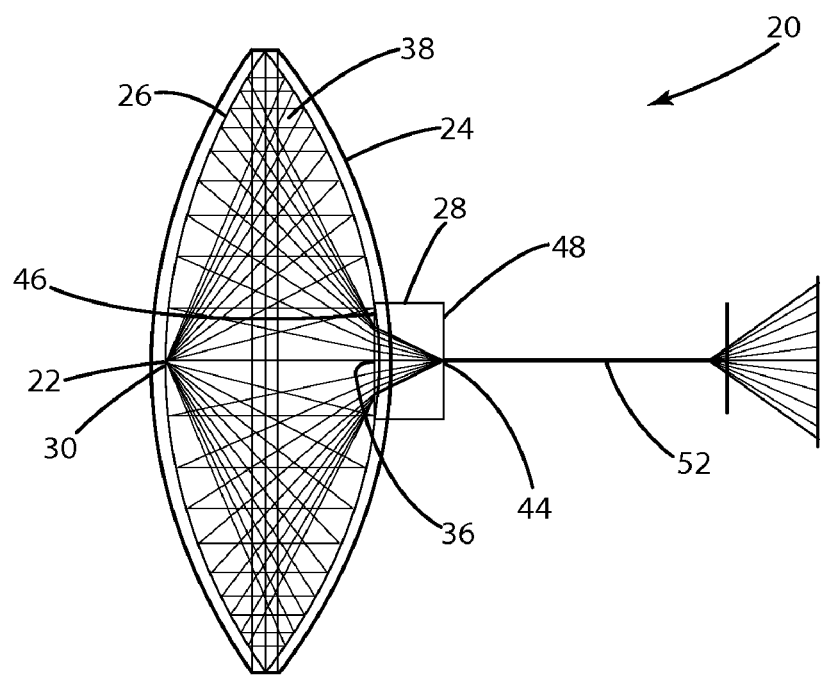
FIG. 6 is an optical ray trace of a cross-sectional view of a fifth embodiment of the invention illustrating a refractive element and optical fiber acting as a fiber optic feed.
Figure 7:
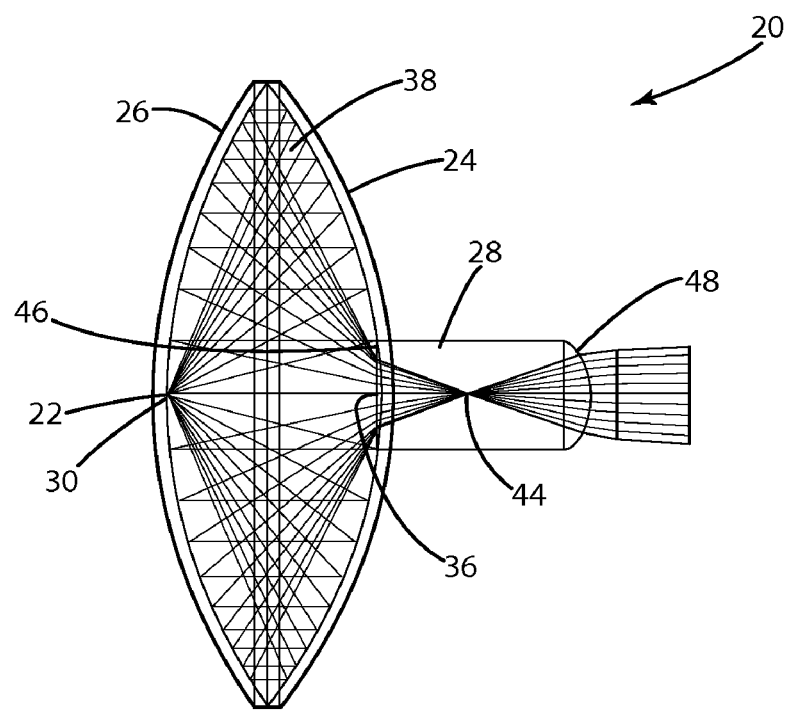
FIG. 7 is an optical ray trace of a cross-sectional view of a sixth embodiment of the invention illustrating a refractive element acting as a shaped area illuminator.

FIGS. 5-7 illustrate several possible configurations for varied optical tasks. As depicted in FIG. 5, light reflecting off the second reflector 26 impinges a negative element 28 having a concave first surface 46. The refracted light converges at a focal plane 44 adjacent a spherical element 50 for creating a collimated beam of light. As depicted in FIG. 6, refracted light converges substantially at the interface between the negative element and one or more optical fibers 52, optionally for a fiber optic feed. As depicted in FIG. 7, the negative or shaping element 28 includes a refractive lens acting as a shaped area illuminator, wherein the shaping element 28 includes a concave first surface 46 and convex second surface 48, with the focal plane 44 located therebetween.

Figure 8:
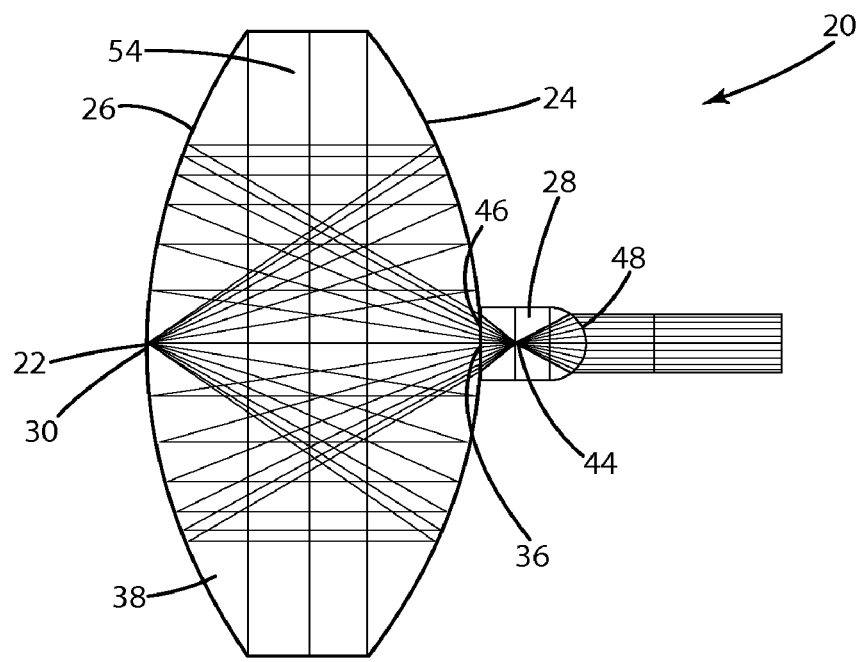
FIG. 8 is an optical ray trace of a cross-sectional view of seventh embodiment of the invention illustrating a refractive medium between the conic reflective surfaces with a refractive element and hemispherical element acting as a collimator.
Figure 9:
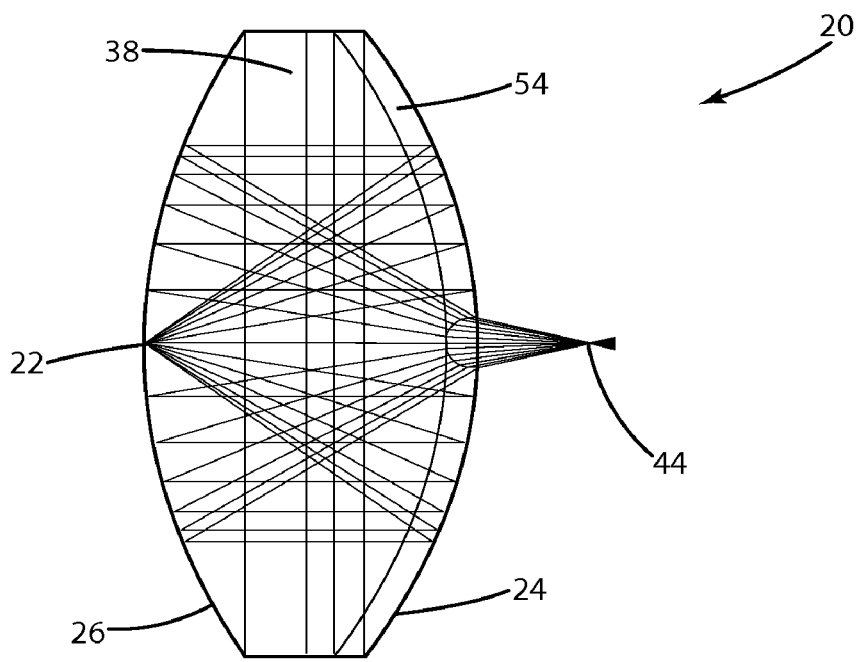
FIG. 9 is an optical ray trace of a cross-sectional view of an eighth embodiment of the invention illustrating a refractive medium between the conic reflective surfaces wherein a conic reflective surface includes a concave surface molded into the refractive medium.

In a seventh embodiment, as depicted in FIG. 8, the high efficiency optical coupler 20 further includes a refractive medium 54 located between the first reflector 24 and the second reflector 26. The negative element 28 is depicted as having a concave first surface 46 aligned with the vertex 36 of the first reflector 24 and a convex second surface 48 or hemispherical second surface 48 for generating a collimated beam. As depicted in FIG. 9, the refractive medium 54 can conform to the first reflector 24 and extend along the first reflector 24 within the enclosure 38 created between the first and second reflectors 24, 26. In this way, the refractive medium 54 replaces the functionality of the negative element 28.

Figure 10:
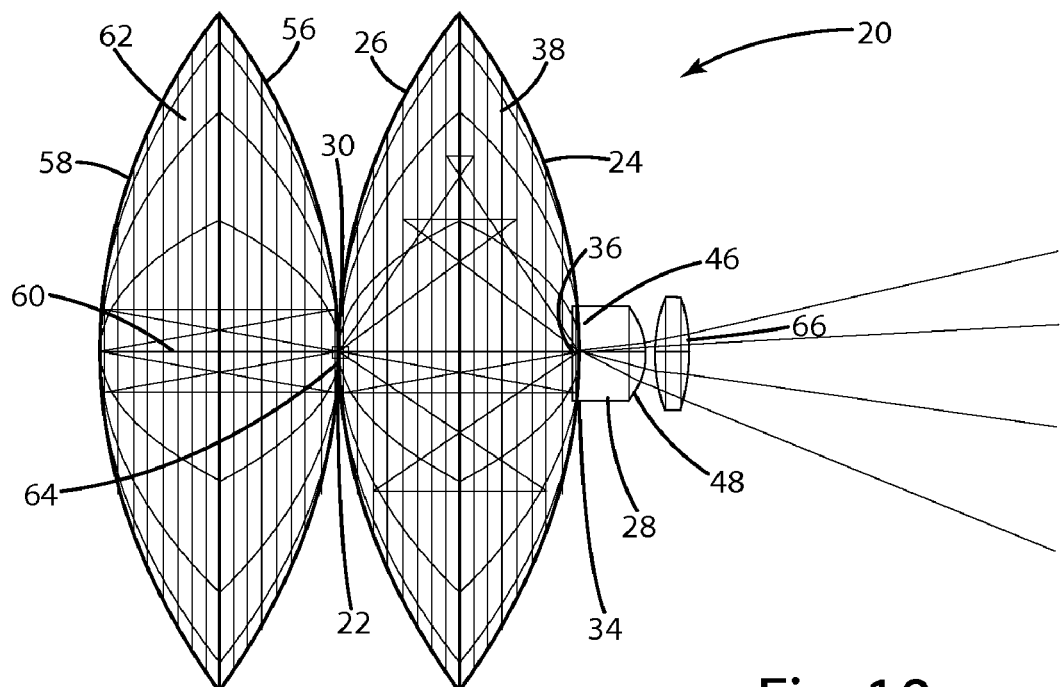
FIG. 10 is an optical ray trace of a cross-sectional view of a ninth embodiment of the invention illustrating a doubled high efficiency optical coupler for use with a spherical light radiator.

In another embodiment, as depicted in FIG. 10, the high efficiency optical coupler 20 further includes a light source 22, a first 24, second 26, third 58 and fourth conic reflector 56, and a negative element 28. The light source 22 is located at the vertex 30 of both the second and fourth conic reflectors 26, 56, which share a common axis 60 and diverge in opposing directions. The first conic reflector 24 includes a first reflector vertex 36 and an aperture 34 therethrough for allowing light to be emitted from the high efficiency optical coupler 20. The first conic reflector 24 is operatively joined with the second conic reflector 26 for creating a first reflective enclosure 38. In like manner, the fourth conic reflector 56 is operatively joined with the third conic reflector 58 for creating a second reflective enclosure 62. Light from the light source 22 reflects off the first conic reflector 24 toward the second conic reflector 26. In like manner, light from the light source 22 reflects off the third conic reflector 58 toward the fourth conic reflector 56, and again toward the third conic reflector 58 before passing through an opening 64 between the first and second enclosures 38, 62 surrounding the light source 22. Light from both enclosures 38, 62 passes through the negative element 28, which as shown in FIG. 10 includes a diverging (concave) first surface 46 and a converging (convex) second surface 48. An additional converging lens 66 is shown as further focusing light from the high efficiency optical coupler 20 for creating a low N.A. light source.

The high efficiency optical coupler device as described above is a re-imager where the first reflector 24 and second reflector 26 reconstitute the emission behavior of the light source 22 at an image point. The opportunity to change the N.A. of the system exists by placing a negative element 28 before the light reaches its focal plane 44. The negative element 28 placed at the vertex 36 of the first reflector 24 can be any one of a wide variety of elements, including a refractive, diffractive, holographic, or reflective element. The conversion for N.A. reduction, for example, can be about 1.72 to 1, where a light source with an N.A. of 0.95 is reduced to an N.A. of 0.55. It is possible to greatly reduce the N.A. but usually at the expense of aberration control. For those skilled in the art, it will be recognized that by reducing the N.A. of the light cone the "usability" of the available light will be greatly enhanced. Those skilled in the art will recognize that there will be optical performance requirements that may be best achieved through the use of index mediums.

The above descriptions are those of current embodiments of the invention. Various alterations and changes can be made without departing from the spirit and broader aspects of the invention as set forth in the following claims, which are to be interpreted in accordance with the principles of patent law including the Doctrine of Equivalents.

The embodiments of the invention in which an exclusive property or privilege is claimed are defined as follows:

1. An optical coupler conversion system comprising:
   a first reflector, wherein said first reflector is a conic and includes a first reflector focus, a first reflector vertex and an aperture at said first reflector vertex;
   a second reflector, wherein said second reflector is curved and includes a second reflector vertex and a focus and is coaxial with said first reflector, wherein said first and second reflectors face one another and said first reflector focus is substantially at said second reflector vertex;
   a light source generally at said second reflector vertex; and
   a negative element aligned with said aperture of said first reflector vertex and having an interior, said second reflector focus being located at least one of within said interior of said negative element and beyond said negative element.

2. The optical coupler conversion system of claim 1, wherein said light source is a point light source located generally at said first reflector focus.

3. The optical coupler conversion system of claim 1 further including:
   a third reflector;
   a fourth reflector facing said third reflector and operatively joined with said third reflector forming a second enclosure, said fourth reflector including a fourth reflector vertex joined with said second reflector vertex and including an opening therethrough, wherein light from said light source is reflected off said first reflector and said third reflector.

4. The optical coupler conversion system of claim 1 wherein said light source includes a light output, said negative element being positioned so that the light output reflected by said second reflector enters said negative element before reaching said second reflector focus.

5. The optical coupler conversion system of claim 1 wherein said light source includes a light output, said negative element being positioned so that the light output reflected by said second reflector converges onto a focal plane past said first reflector vertex.

6. An optical coupler conversion system comprising:
   a first reflector, wherein said first reflector is a conic and includes a first reflector vertex, a first conic focus, and an aperture at said first reflector vertex;

a second reflector including a second reflector vertex and coaxial with said first reflector, wherein said first and second reflectors face one another;
a light source generally at said second reflector vertex and generally at said first conic focus; and
a negative element aligned with said aperture of said first reflector vertex and defining an interior, wherein said second reflector is a conic including a second conic focus located within said interior of said negative element.

7. The optical coupler conversion system of claim 6 further including a light output, wherein said light output impinges said negative element prior to converging at a focal plane.

8. The optical coupler conversion system of claim 7, wherein said focal plane is located within said negative element.

9. The optical coupler conversion system of claim 8, wherein said first reflector and second reflector are operatively joined for forming a first enclosure.

10. The optical coupler conversion system of claim 9, wherein said negative element includes a double concave refractive lens.

11. The optical coupler conversion system of claim 9, wherein first reflector and said second reflector further include a refractive medium therebetween.

12. The optical coupler conversion system of claim 9 further including a spherical refractive element adjacent said negative element for creating a collimated light source.

13. The optical coupler conversion system of claim 9 further including a light output and an optical fiber for receiving said light output.

14. The optical coupler conversion system of claim 9, wherein said negative element includes a hemispherical surface for creating a collimated light source.

15. A light coupler for creating a light output, said light coupler comprising:
a light source;
a first conic reflector including a first vertex, an optical aperture at said first vertex, and a first conic focus at said light source;
a second conic reflector facing said first conic reflector and operatively joined with said first conic reflector for creating an enclosure, said second conic reflector including a second vertex substantially at said first conic focus, said light source tangentially joined with said second conic reflector within said enclosure substantially at said second vertex; and
a negative element aligned with said optical aperture in said first conic reflector, wherein said second conic reflector includes a second conic focus located within said negative element.

16. The light coupler of claim 15, wherein said light source has a light output entering said negative element prior to converging at a focal plane.

17. The light coupler of claim 15, wherein said second vertex is separated from said first vertex by a first distance, said first distance being less than a second distance separating said second vertex from said second conic focus.

18. The light coupler of claim 15, wherein said first conic reflector is parabolic.

19. The light coupler of claim 15, wherein said negative element includes a double concave refractive lens.

20. The light coupler of claim 15 further including an optical fiber for receiving said light output.

21. The light coupler of claim 15, wherein said negative element further includes a hemispherical surface for creating a collimated light source.

22. The light coupler of claim 15, wherein said first and second conic reflectors form a continuous molded structure.

23. The light coupler of claim 15, wherein said first and second conic reflectors include first and second reflective surfaces, respectively, wherein said first and second reflective surfaces comprise polished aluminum.

24. An optical coupler conversion system comprising:
a first reflective enclosure including a first conic reflector and a second conic reflector, said first conic reflector including a first focus, a first vertex and a first aperture at said first vertex, said second conic reflector including a second vertex at said first conic focus, wherein said first and second conic reflectors face one another and are operatively joined with one another;
a second reflective enclosure including a third conic reflector having a third focus, a third vertex and a fourth conic reflector having a fourth vertex at said third conic focus, wherein said third and fourth conic reflectors face one another and are operatively joined with one another, said second vertex of said second conic reflector being joined with said fourth vertex of said fourth conic reflector and defining an opening therethrough wherein said first reflective enclosure is in fluid communication with said second reflective enclosure via said opening;
a light source at said vertex of said second and fourth conic reflectors; and
a negative element aligned with said aperture of said first reflector.

25. The optical coupler conversion system of claim 24 further including a light output, wherein said light output impinges said negative element prior to converging at a focal plane.

26. The optical coupler conversion system of claim 24 wherein said light source is cooperatively located at said first conic focus and said third conic focus.

27. The optical coupler conversion system of claim 24 wherein said negative element defines an interior and said second conic focus is located within said interior of said negative element.

28. An optical coupler conversion system comprising:
a first curved reflector including a first reflector vertex and an aperture at said first reflector vertex;
a second reflector facing said first curved reflector;
a light source adjacent said second reflector, said light source including a light output; and
a negative element aligned with said aperture of said first reflector vertex, wherein said negative element includes an interior and is positioned so that light output reflected by said first and second reflectors, sequentially, enters said interior of said negative element before converging at a focal plane.

29. The optical coupler system of claim 28 wherein said second reflector includes a focus located at least one of within and beyond said negative element.

30. The optical coupler system of claim 28 wherein said second reflector includes a vertex, said light source being positioned generally at said second reflector vertex.

31. The optical coupler system of claim 28 wherein said second reflector includes a focus, said negative element being positioned so that the light output reflected by said second reflector enters said negative element before reaching said second reflector focus.

32. The optical coupler system of claim 28 wherein said second reflector is operable to converge the light output onto a focal plane past the vertex of said first conic reflector.

* * * * *